United States Patent
Hiroshige

(10) Patent No.: US 10,140,348 B2
(45) Date of Patent: Nov. 27, 2018

(54) SYSTEM FOR AUTOMATICALLY TRACKING DATA THROUGH A PLURALITY OF DATA SOURCES AND PLURALITY OF CONVERSIONS

(71) Applicant: Phillip Hiroshige, Carlsbad, CA (US)

(72) Inventor: Phillip Hiroshige, Carlsbad, CA (US)

( * ) Notice: Subject to any disclaimer, the term of this patent is extended or adjusted under 35 U.S.C. 154(b) by 463 days.

(21) Appl. No.: 14/846,910

(22) Filed: Sep. 7, 2015

(65) Prior Publication Data

US 2016/0314143 A1    Oct. 27, 2016

Related U.S. Application Data

(60) Provisional application No. 62/152,865, filed on Apr. 25, 2015.

(51) Int. Cl.
*G06F 17/30* (2006.01)

(52) U.S. Cl.
CPC .. *G06F 17/30569* (2013.01); *G06F 17/30563* (2013.01)

(58) Field of Classification Search
CPC ............... G06F 17/30569; G06F 17/30563
See application file for complete search history.

(56) References Cited

U.S. PATENT DOCUMENTS

| | | | |
|---|---|---|---|
| 7,428,726 B1 * | 9/2008 | Cowan ............... | G06F 11/368 717/121 |
| 9,501,556 B2 * | 11/2016 | King ............... | G06F 17/30607 |
| 2005/0154695 A1 * | 7/2005 | Gonzalez ............ | G06F 17/30306 |
| 2005/0256908 A1 * | 11/2005 | Yang ............... | G06F 17/30569 |
| 2006/0143243 A1 * | 6/2006 | Polo-Malouvier ........... | G06F 17/30516 |
| 2007/0220507 A1 * | 9/2007 | Back ............... | G06F 8/71 717/170 |
| 2011/0289112 A1 * | 11/2011 | Kamimura .......... | G06F 17/3033 707/769 |
| 2012/0179675 A1 * | 7/2012 | Friedman ............ | G06Q 10/10 707/736 |
| 2014/0310233 A1 * | 10/2014 | Catalano, Sr. ..... | G06F 17/30563 707/602 |
| 2016/0231997 A1 * | 8/2016 | Mihara .............. | G06F 8/665 |

* cited by examiner

Primary Examiner — Jorge A Casanova

(74) Attorney, Agent, or Firm — Marin Patents, LP; Gustavo Marin

(57) ABSTRACT

A networked computing system where data from multiple sources is automatically tracked through a plurality of conversion steps at the data row and element level. The system allows input of data conversion metadata. The system automatically applies a version number to the conversion metadata. The system includes a data conversion engine. The data conversion engine ensures that processing metadata versions are in sync with versions of converted data. The conversion engine creates version synchronization at the data row and element level thus allowing data tracking at the data row and element level. The system includes a database that stores conversion metadata and execution attributes and a graphical user interface that allows the user access to the conversion metadata.

20 Claims, 11 Drawing Sheets

SYSTEM FOR AUTOMATICALLY TRACKING DATA THROUGH A PLURALITY OF DATA SOURCES AND PLURALITY OF CONVERSIONS

CROSS REFERENCE TO RELATED APPLICATIONS

This application claims priority to and the benefit of the filing date of U.S. Provisional Application No. 62/152,865, filed on Apr. 25, 2015, entitled "SYSTEM FOR AUTOMATICALLY TRACKING DATA THROUGH A PLURALITY OF DATA SOURCES AND PLURALITY OF CONVERSIONS AT ROW AND ELEMENT LEVEL", which is hereby incorporated by reference in its entirety.

FIELD OF THE INVENTION

This patent specification relates to the field of systems configured to track data through a plurality of data sources. More specifically, this patent specification relates to systems for tracking data through a plurality of data sources and plurality of conversions such as at the row and element level.

BACKGROUND

Computing systems are used to store and retrieve data. Due to the proliferation of data sources and the connected nature of computing systems, tracking where data originates and how it was processed has become extremely difficult. The data generated by computing systems is typically stored in a database in a format defined by the processing application. For example, a computing system used to process health records will store the data in a format that allows a health practitioner to retrieve and process patient data. There are a multitude of computing systems that are designed to process health records but each computing system may not store the health records in the same format. When data is collected from each source system, it is often critical to the collector that the data abide by format and business rules. For example, pharmaceutical data must comply with standards before it can be submitted to the FDA. Determining compliance not only requires verifying format but knowledge of how data was processed as well as data sources. Recording the data sources and processing steps for data as it moves through the data supply chain is called data tracking.

Because multiple systems may be involved in producing, processing and sharing data, data tracking has become a necessity. Sharing data requires that the storage and exchange format be standardized. Standards exist to expedite analysis or allow sharing. Standards also exist to protect privacy and ensure safety. Personal or financial data must be tracked to comply with privacy laws. Financial data must be tracked to comply with accounting rules and regulations.

Although standards are necessary for sharing data, they can create challenges for data tracking. Computing systems that need to share data are not necessarily produced by the same vendor. If multiple entities are involved in data sharing, each entity can create their own standard. Even when multiple entities agree on a standard, multiple revisions are necessary as the standard is refined. Furthermore, in computing systems designed for scientific research, the discovery nature of science necessitates creation of new domains to be added to the standard. Thus creating standardized data if often a multistep process with multiple versions of data at each step. As the number of steps increases, data tracking becomes increasingly difficult.

In order to track data, many approaches and tools have been utilized. Datasets can be manually converted and transferred to comply with standards and regulations. Data describing the source of data, and the type of processing and data standards utilized is called metadata. Metadata is critical to data tracking, but in most current systems, it is manually recorded. When metadata is manually entered, either before or after the data is transferred and converted, it can get out of sync with the datasets. In other words, the metadata may not actually reflect what was performed on the data. Accurate data tracking requires knowledge of what metadata corresponds to a particular dataset.

Extraction Transformation and Loading (ETL) programs are used to convert data. ETL programs are either manually written using a programming language or created using an ETL creation tool. An ETL creation tool is good for automatically creating ETL programs that conform to common conversion patterns. The ETL tool user selects pre built conversion building blocks and manually fills in specific parameters. For example, a user may select a building block that writes data into a database. The user manually fills in the data source connection parameters and how data will be mapped from a source to target dataset. Although the ETL program is then created automatically, it is still up to the ETL programmer to manually record what ETL program was used on every resultant dataset. Datasets may go through a series of cascading conversions and validations. Each step of the series requires a different ETL program. For data tracking purposes, the ETL program must be recorded and related to the dataset. This is especially important if a dataset fails validation at a final step. In order to determine which conversion step introduced invalid data, a mechanism to retrieve the ETL program and the resultant datasets is necessary. For example, if a dataset has invalid data, the previous dataset and the latest conversion must be examined. This is problematic because each conversion step may have multiple ETL versions. The multiple versions may be due to data irregularities or variations of business rules implemented. In current practice, the ETL program associated to each step is manually recorded. Due to the complexity of manual recording processes, datasets can get out of sync with the ETL program.

Currently systems exist that allow a user to manually capture metadata describing data conversion activities. These systems are often referred to as metadata management or semantic management systems. These systems allow users to manually enter data describing how data sets are going to be converted or how they data sets were converted. When using these systems, it is up to the user to insure that the conversion programs convert data according to the metadata that was entered. For instance, the metadata may indicate that a data element in a source data set be extracted, undergo a format conversion and then be loaded into a data element in a target dataset. It is up to the ETL programmer to create programs that insure the data element is extracted, converted and loaded according to the metadata entered into the metadata management system.

Systems exist to manage changes to computer programs. These systems are referred to as software revision control or software configuration management systems. These systems manage changes to programs by applying a new version number to a program if it is changed. Revision control systems can be used to track revisions of conversion programs. The problem is these systems are designed to track revisions in computer programs not computer data. These systems were not designed to associate a conversion program and its resultant data.

Methodologies exists that associate metadata to a dataset. Using a system that tracks data workflow, a workflow step could be created that automatically logs metadata information associated with a data set conversion. This methodology can't record metadata at a row or element level. For example, this methodology can store information regarding the processing of an entire dataset but it can't record information regarding the processing of an individual data element such as a patient's blood pressure. Therefore, a system does not exist that automatically applies revision management to data conversion metadata and associated data down to the row and element level.

BRIEF SUMMARY OF THE INVENTION

The system described herein documents a novel approach to tracking data through a plurality of data sources and data conversions using automated data conversion. Embodiments include a computing system that tracks data through a plurality of conversions by automatically creating conversion programs based on conversion metadata. The conversion metadata may be automatically revision managed by applying version numbers to each new revision of metadata. Embodiments of this system can automatically attach version information to the programs created based on the conversion metadata. The programs that convert data may attach the version information to the resultant data. Automatic versioning of processing metadata, conversion processes and resultant data keeps processing metadata tied to the resultant data through matching version IDs. The versioned metadata may be kept in a database. The system allows access to this database, so that a variety of data tracking operations are possible.

The platform includes a database capable of storing conversion metadata, multiple datasets and a central management module that provides access to conversion metadata as well as the location of the resultant datasets. Source dataset(s), conversion metadata and the resultant dataset will be referred to as a data build. The integrity of a data build is due to the fact that the metadata creates the conversion program which, when executed, converts the source data into the target data. Data builds are the building blocks used to create multistep data conversion flows. The system comprises a data build manager to store and access data build metadata as well as execution information. The metadata stored in the data build manager is used to categorize, group, sequence, and execute data builds. A sequence of data builds will be referred to as a data flow. Resultant datasets from each data build are archived and may be outputted.

The system supports operations on the target dataset of each data build. Operations on the target datasets may be guided by the data build's conversion metadata presented to the user via a Graphical User Interface (GUI). An embodiment of the system would allow comparing the target datasets from a group of data builds that share a common source dataset. An embodiment would allow merging datasets from data builds whose sources and conversion processing may be different but whose resultant datasets are in compliance with the same regulatory requirements. An embodiment would allow direct SQL access to a data build's datasets as well as mechanisms to export the datasets.

In some embodiments, a method of data tracking a source dataset comprising a plurality of data elements in a computer system which has a memory and a processor may comprise the steps of: storing data conversion instructions for one or more data elements as conversion metadata associated with the source dataset in the memory; creating a unique version number with the processor based on the conversion metadata; creating a conversion program from the conversion instructions of the conversion metadata; running the conversion program to perform a data conversion with the processor on one or more data elements of the source dataset to form a target dataset comprising one or more converted data elements; and associating and storing the unique version number with the conversion metadata, with the conversion program, and with the target dataset with the processor in the memory.

In further embodiments, a method of data tracking a source dataset comprising a plurality of data elements in a computer system which has a memory and a processor may comprise the steps of: storing data conversion instructions for one or more data elements as conversion metadata associated with the source dataset in the memory; creating a unique version number with the processor based on the conversion metadata; creating a conversion program from the conversion instructions of the conversion metadata; running the conversion program to perform a data conversion with the processor on one or more data elements of the source dataset to form a target dataset comprising one or more converted data elements; and associating and storing the unique version number with the conversion metadata, with the conversion program, and with each converted data element with the processor in the memory.

In still further embodiments, a unique version number may be created when the conversion metadata is modified. In still further embodiments, the unique version number created when the conversion metadata is modified may be associated and stored with the conversion metadata, with the conversion program, and with the target dataset with the processor in the memory.

BRIEF DESCRIPTION OF THE DRAWINGS

A more complete understanding of embodiments of the present invention and advantages thereof may be acquired by referring to the following description taken in conjunction with the accompanying drawings. Understanding that these drawings depict only typical embodiments and are not therefore to be considered to be limiting in scope. Embodiments will be described and explained with additional specificity and detail through the use of the accompanying drawings in which.

DETAILED DESCRIPTION OF THE INVENTION

Figure 1:
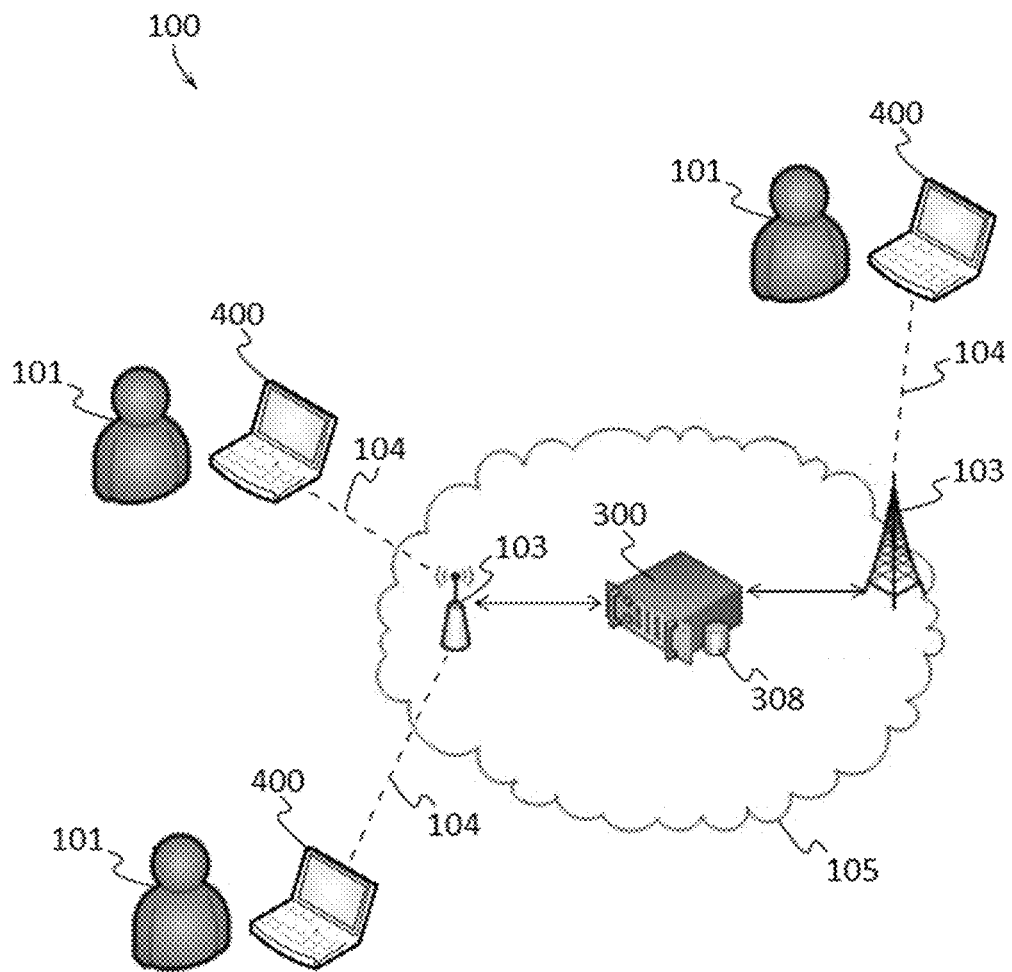
FIG. 1 an illustrative example of some of the components and computer implemented methods which may be found in a system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "software", "software code" or "computer software" refers to any set of instructions operable to cause a computer to perform an operation. Software code may be operated on by a "rules engine" or processor. Thus, the methods and systems of the present invention may be performed by a computer based on instructions received by computer software.

The term "client device" as used herein is a type of electronic device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include; personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include; cell phones, smart phones, tablet computers, laptop computers, wearable computers such as watches, Google Glasses, etc. and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include wifi and cellular networks.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New systems and methods for automatically tracking data through a plurality of data sources and plurality of conversions are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a system for automatically tracking data through a plurality of data sources and plurality of conversions, "the system" 100, according to some embodiments is presented. The system 100 is configured to facilitate the transfer of data and information between one or more client devices 400 and servers 300 over a data network 105 with one or more databases on a data store 308 accessible by a server 300. Each client device 400 may comprise a wired or wireless network connection 104 to an access point 103 which may provide access to the data network 105. In further embodiments, data and information may be transferred between a data store 408 (FIG. 3) of one or more client devices 400 and/or a data store 308 accessible by a server 300 to be operated on by one or more processors 402 (FIG. 3) of one or more client devices 400 and/or to be operated on by one or more processors 302 (FIG. 2) of a server 300.

In this example, the system 100 comprises at least one client device 400 (but preferably more than two client devices 400) configured to be operated by one or more users 101. Wireless client devices 400 can be mobile devices such as laptops, personal digital assistants, IP phones and other smart phones, or fixed devices such as desktops and workstations that are equipped with a wireless network interface capable of sending data to one or more servers 300 with access to one or more data stores 308 over a data network 105.

Some embodiments of the system 100 described herein implement the ability to track data by automating data conversion through metadata. Data may be stored in a database on a memory accessible to a processor 302 (FIG. 2), 402 (FIG. 3), such as on one or more data stores 308 (FIGS. 1 and 2), 408 (FIG. 3). The data in a database may comprise a plurality of data elements. Data elements in a database may be organized in any format such as with one or more fields, rows, columns, or any other format. Metadata, comprising information on or about a database and/or with data elements in a database may be associated with the database and/or with data elements in the database. Conversion instructions may comprise instructions which may be used to cause or instruct a computer to perform a data conversion operation on one or more source databases and/or on one or more source data elements in a source database to form a converted or one or more target databases and/or on one or more target data elements in a target database.

Figure 2:
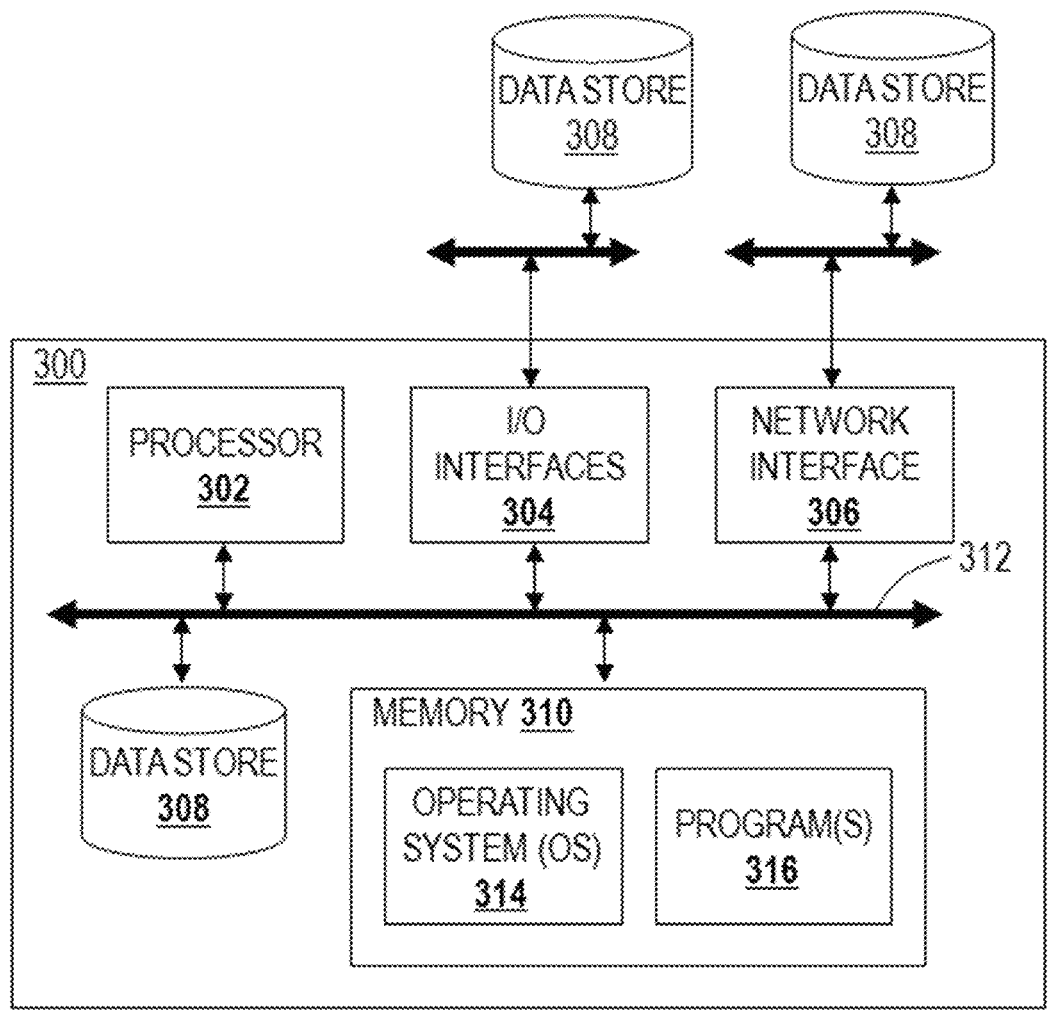
FIG. 2 depicts an example of a block diagram of a server which may be used in the system or standalone according to various embodiments described herein.
Figure 3:
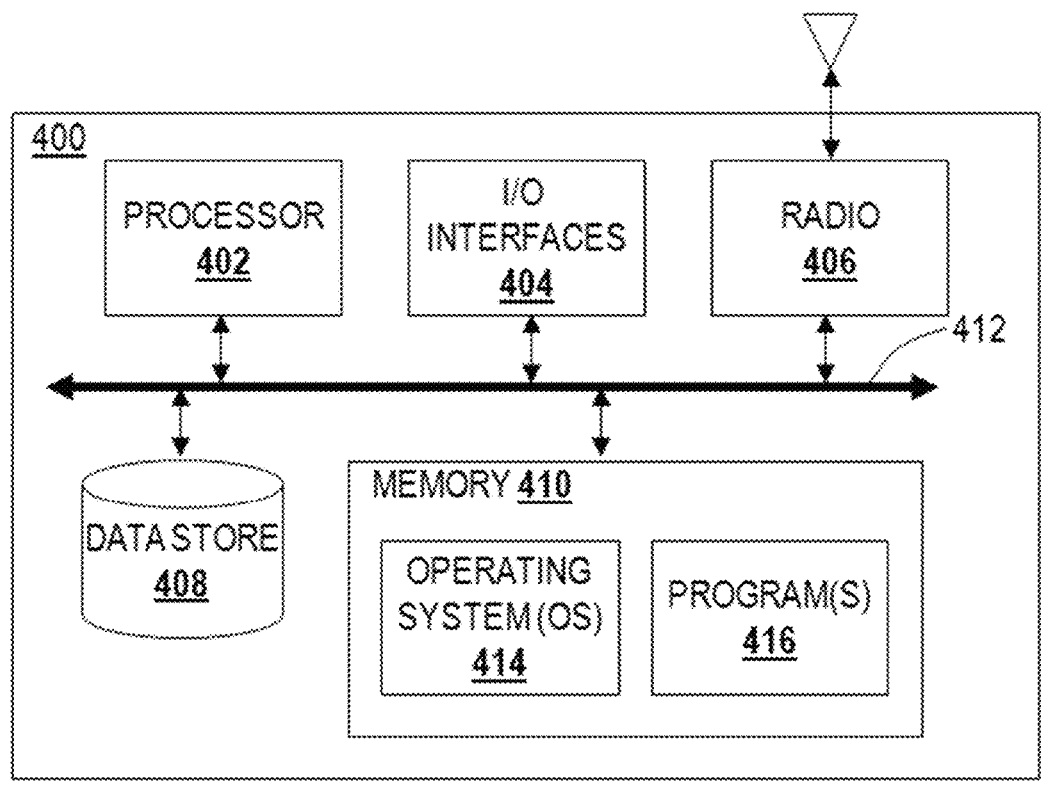
FIG. 3 shows an example of a block diagram of a client device according to various embodiments described herein.

Referring to FIG. 2, in an exemplary embodiment, a block diagram illustrates a server 300 which may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be, for example Windows NT, Windows 2000, Windows XP, Windows Vista, Windows 7, Windows 8, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 316 may be configured to implement the various processes, algorithms, methods, techniques, etc. described herein.

Referring to FIG. 3, in an exemplary embodiment, a block diagram illustrates a client device 400, which may be used in the system 100 or the like. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications. The I/O interfaces 404 can be used to receive input from a user or other source and/or for providing system output. User input can be provided via, for example, a keypad, a touch screen, a scroll ball, a scroll bar, buttons, bar code scanner, voice recognition, eye gesture, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); VHF spectrum, AM spectrum, wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

In some preferred embodiments, the client device 400 includes a global positioning system sensor configured to receive latitude and longitude coordinates from satellites (i.e. a GPS signal).

In some other preferred embodiments, the client device 400 includes an accelerometer configured to receive user initiated actions (e.g. shaking the device, moving the device in a pattern, etc.).

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 3, the software in the memory system 410 includes a suitable operating system (O/S) 414 and programs 416. The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), and the like. The programs 416 may include various applications, add-ons, etc. configured to provide end user functionality with the client device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

Referring now to FIGS. 4-10 and in some embodiments, one or more conversion instructions for a source database, optionally down to the row and element level, may captured in the metadata as conversion metadata. Conversion programs may be automatically created by the system 100 based on the conversion metadata. Conversion metadata may include data validation information such as links to regulatory standard references. The conversion metadata may also contain information about the source data and information about the data that results from running a conversion program.

The dataset resulting from the conversion activities of a conversion program may be in many forms such as a table in a database or a file on a distributed file system. Regardless of the form, the resultant dataset will be referred to as the target dataset. Conversion programs created from the conversion metadata may be executed on a single computing node, such as by a client device 400 (FIGS. 1 and 3) or server 300 (FIGS. 1 and 2), or in parallel on a plurality of computing nodes, such as on one or more client devices 400 and/or servers 300. If a conversion program is run in parallel, the conversion program may have plurality of steps such as a step run on the plurality of nodes and a step to collate the results from each node. When a conversion program is executed, conversion runtime information, such as time of execution and execution status, may be created by the conversion program. Conversion runtime information, such as time of execution, execution duration, and execution status, will be referred to as execution attributes. In some embodiments, conversion runtime information or execution attributes may comprise time of execution, execution duration, execution status, and/or any other data related to conversion execution. Conversion metadata, execution attributes, and source and target datasets will be referred to as a data build. The data build's conversion metadata and execution attributes may be stored in a data build database. A data build manager engine 180 may be used to group data builds into data flows. The data build manager may also execute data processing operations as well as record execution times and run time parameters. Furthermore, the data build manager may archive and perform operations on target datasets from any data build.

A data build may contain processing metadata as well as source and target data which may be contained in source datasets and target datasets, respectively. Accurate data tracking requires knowledge of the source of data as well as the processing that was performed on the data. In some embodiments, instructions for processing and source of data are recorded in conversion metadata. Conversion metadata and resultant datasets are kept in sync by attaching the same version ID to the metadata and resultant data sets. Version IDs are kept in sync automatically through the automated creation of processing programs. This will be referred to as automated versioning.

Figure 4:
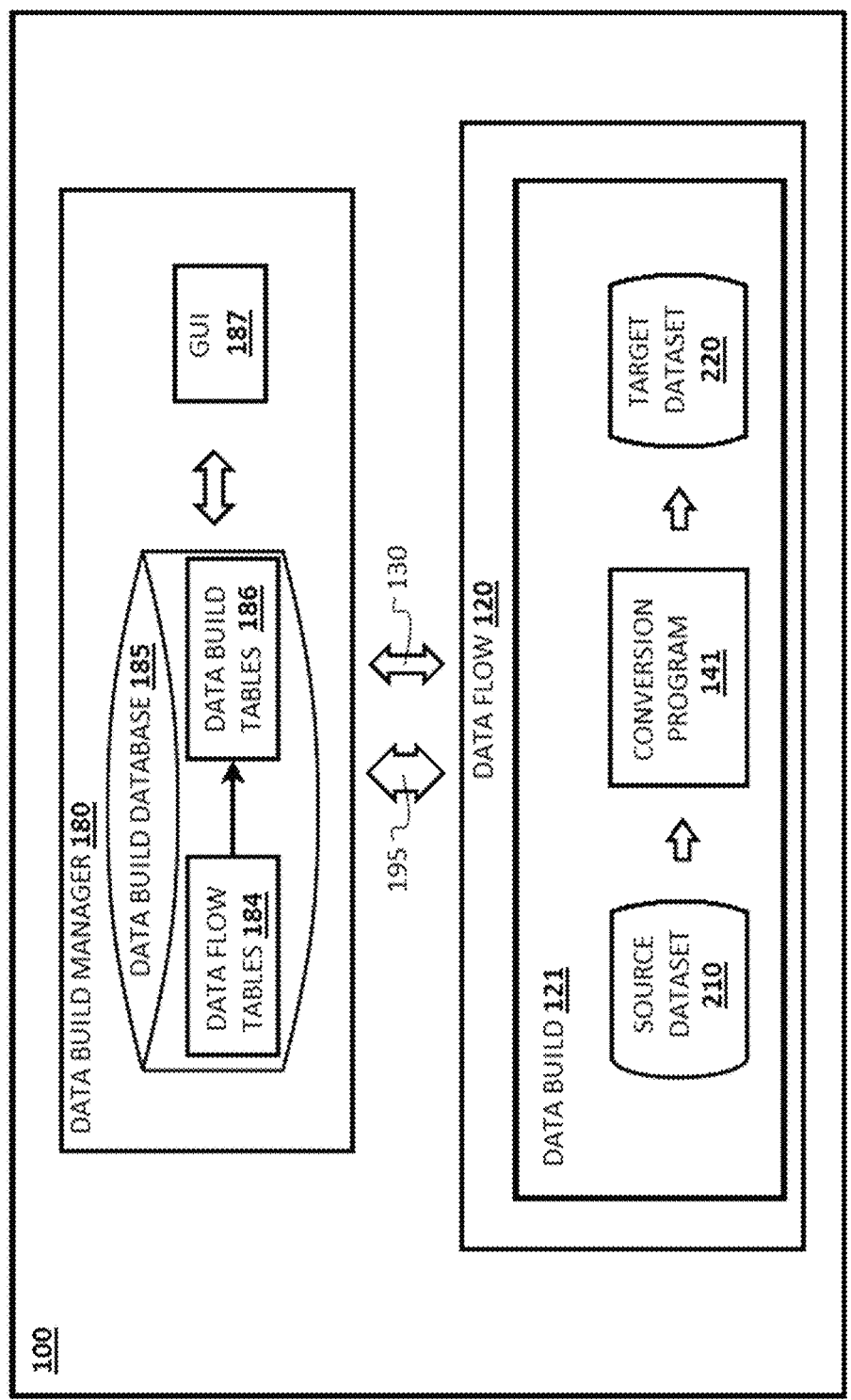
FIG. 4 illustrates an example of how a data build and a data flow can be tracked according to various embodiments described herein.

FIG. 4 illustrates an example of how a data build 121 and a data flow 120 can be tracked according to various embodiments described herein. In some embodiments, the source dataset 210, conversion program 150 comprising processing metadata and execution attributes, and resultant target dataset 220 may be referred to as a data build 121. The data build information may be kept in a data build database 185 in one or more data build tables 186 which may be managed by a data build manager engine 180. Interaction with the data build manager engine 180 may be performed through a graphical user interface (GUI) 187 which may be provided by an I/O Interface 304, 404 of a server 300 or client device 400.

In some embodiments, a GUI 187 may be used to input data into the data build manager engine 180 which can be used to create or view one or more data flows 120 based on conversion metadata which may be used to create a conversion program 150. Each data flow 120 may comprise one or more data builds 121. In some embodiments, a first data build 121 and a second data build 122 and any number of other data builds 123 may be stored as a data flow 120. Additionally, each data flow 120 may comprise lineage data describing the relationship between a first data build 121 and the second data build 122 and any number of other data builds 123. A conversion program 150 may convert a source dataset 210 to a target dataset 220 based on conversion instructions contained in conversion metadata. Storage and management of conversion metadata at the data build level allows decomposition and construction of complex and multistep data flows 120. In further embodiments, a GUI 187 may present summary information, such as name and type of the data builds 121, 122, 123, in a data flow 120. By using the GUI 187 to select an item of summary information regarding a data build, the conversion metadata associated with the summary information of that data build may then be presented to the user by the GUI 187.

Figure 5:
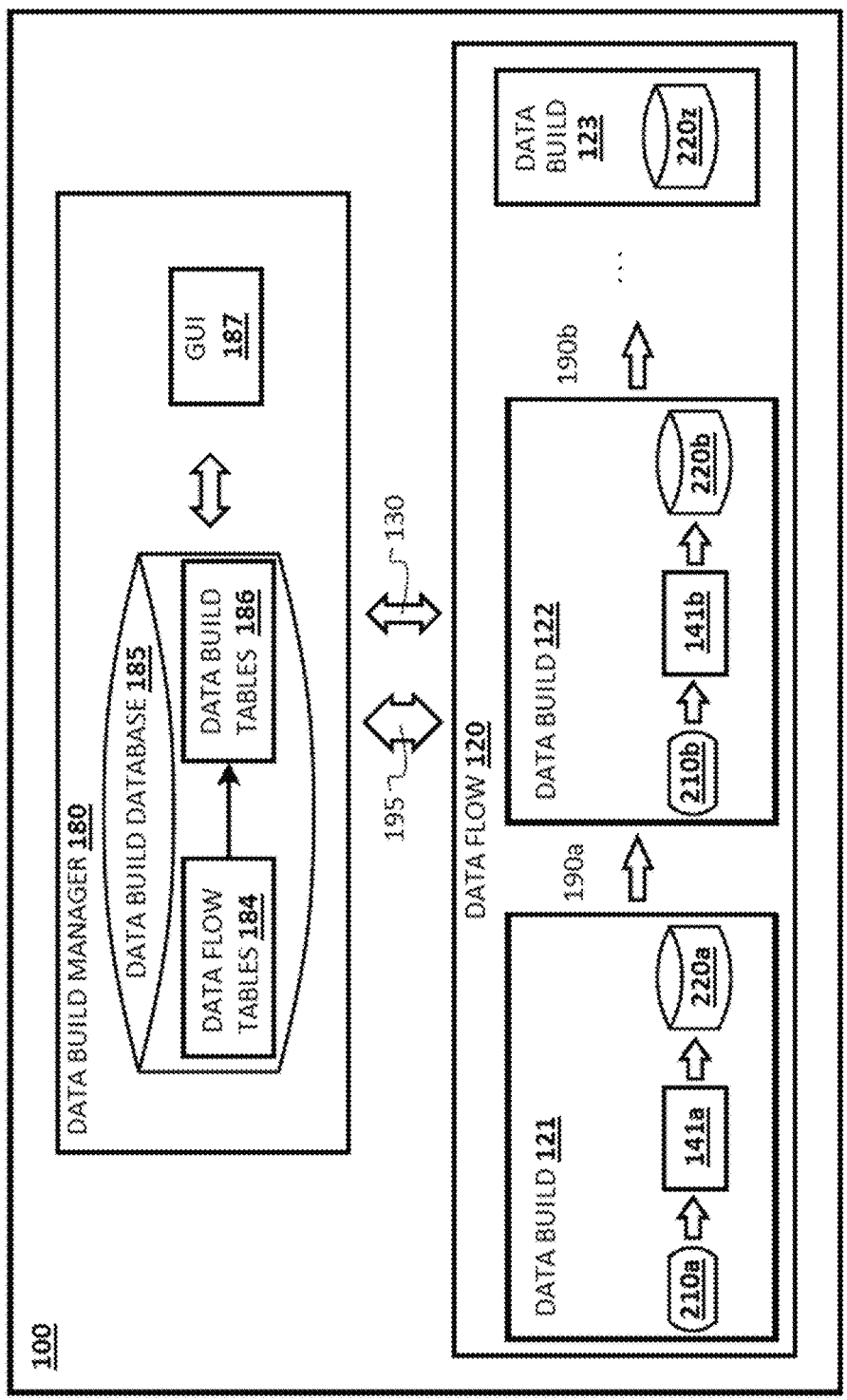
FIG. 5 illustrates an example of how plurality of data builds can be tracked according to various embodiments described herein.

Turning now to FIG. 5, all target datasets 220, such as a first target dataset 220*a*, second target dataset 220*b*, final target dataset 220*z*, may be archived and their location and access information may be stored in the Data Build Database 185. This allows operations on the final resultant target dataset 220*z* or any intermediate target datasets 220 such as a first target dataset 220*a*, second target dataset 220*b*, and the like. The data build manager engine 180 may also generate data tracking or lineage reports based on conversion metadata from related data builds 121, 122, 123.

A sequential grouping of data builds 121, 122, 123, may be referred to as a data flow 120, and each data flow 120 may comprise any number of data builds 121, 122, 123. In some embodiments, the data build database 185 may comprise data, such as a table containing data flow attributes 184, which may serve as a parent table to a table containing data build attributes 186. Data flow information may include data build sequence and run time information. Data builds 121, 122, 123 may be grouped and sequenced into a data flow 120. Data flow information may be stored in dataflow tables 184 in the data build database 185. Thus, data build and data flow information 195 from the database 185 can be used to automatically create one or more data conversion processing steps 190*a*, 190*b*.

FIG. 5 illustrates an example of how plurality of data builds 121, 122, 123, can be tracked according to various embodiments described herein. In some embodiments, data builds 121, 122, 123, may be used to create multistep data processing operations. As illustrated in FIG. 5, a data flow 120 can be broken down into a series of data builds 121, 122, 123, and each data build 121, 122, 123, may comprise a source dataset 210 and a target dataset 220. A target dataset 220 may be used as the source dataset 210 of a subsequent data build 121, 122, 123. For example, a first target dataset 220a of a first data build 121 may be used as a second source dataset 210b of a second data build 122 and this process may be repeated any number of times, creating a series of data builds, until a final resultant target dataset 220z is produced. Multiple data builds 121, 122, 123, can be sequenced together resulting in a final data build 123 with a final resultant target dataset 220z. In some embodiments, the target dataset 220a of a first data build 121 is used as a second source dataset 210b to create a second data build 122 comprising the second source dataset 210b, a second conversion metadata with a second associated unique version number, and a second target dataset 220b with the second associated unique version number. Information regarding all conversion activities in the data flow 120 may be maintained in the data build database 185. Since the conversion metadata in the data build database 185 is recorded and used to create the conversion programs 141a, 141b, of the data builds 121, 122, 123, for each data flow 120, the conversion metadata information is guaranteed to be consistent with respect to all datasets 210, 131, involved in a data flow 120. In some embodiments, lineage of resultant target datasets 220 can be traced back through an involved second data build 122 and a first data build 121 through conversion metadata stored in the data build database 185. In further embodiments, the lineage data can be viewed or reported through interaction with the data build manager engine 180, such as through a GUI 187.

In some embodiments, a first data flow 120a can be created that has a first source data set 210a. One or more second data flows 120 could also be created that has the same said first source data set 210a. Data flow conversion information 195 could be selected for viewing or reporting by filtering data that has a specific source dataset 210 such as a first source data set 210a. Filtering data based on a specific source data set may be accomplished through the data build manager engine 180 GUI 187. Data flow conversion information 195 for a data flow 120 may contain conversion details of a first data build 121, a second data build 122, a third data build 123, and/or any number of other related data builds. In further embodiments, data flow conversion information 195 may comprise data build execution attribute data 130. Data selected for viewing or reporting may be at data set row or at the data element level. In further embodiments, a GUI 187 may present summary information, of the data builds 121, 122, 123, in a data flow 120. By using the GUI 187 to select an item of summary information regarding a data build, the conversion metadata associated with the summary information of that data build may then be presented to the user by the GUI 187 at data set row or at the data element level.

In some embodiments, multiple data tracking systems 100 could be networked together. In further embodiments, a master data tracking system 100 could have access to the database 185 of a plurality of monitored subordinate data tracking systems 100. The master data tracking system 100 may use conversion metadata from a plurality of data tracking systems 100 to create data tracking and data lineage reports that span a plurality of data tracking systems 100.

Figure 6:
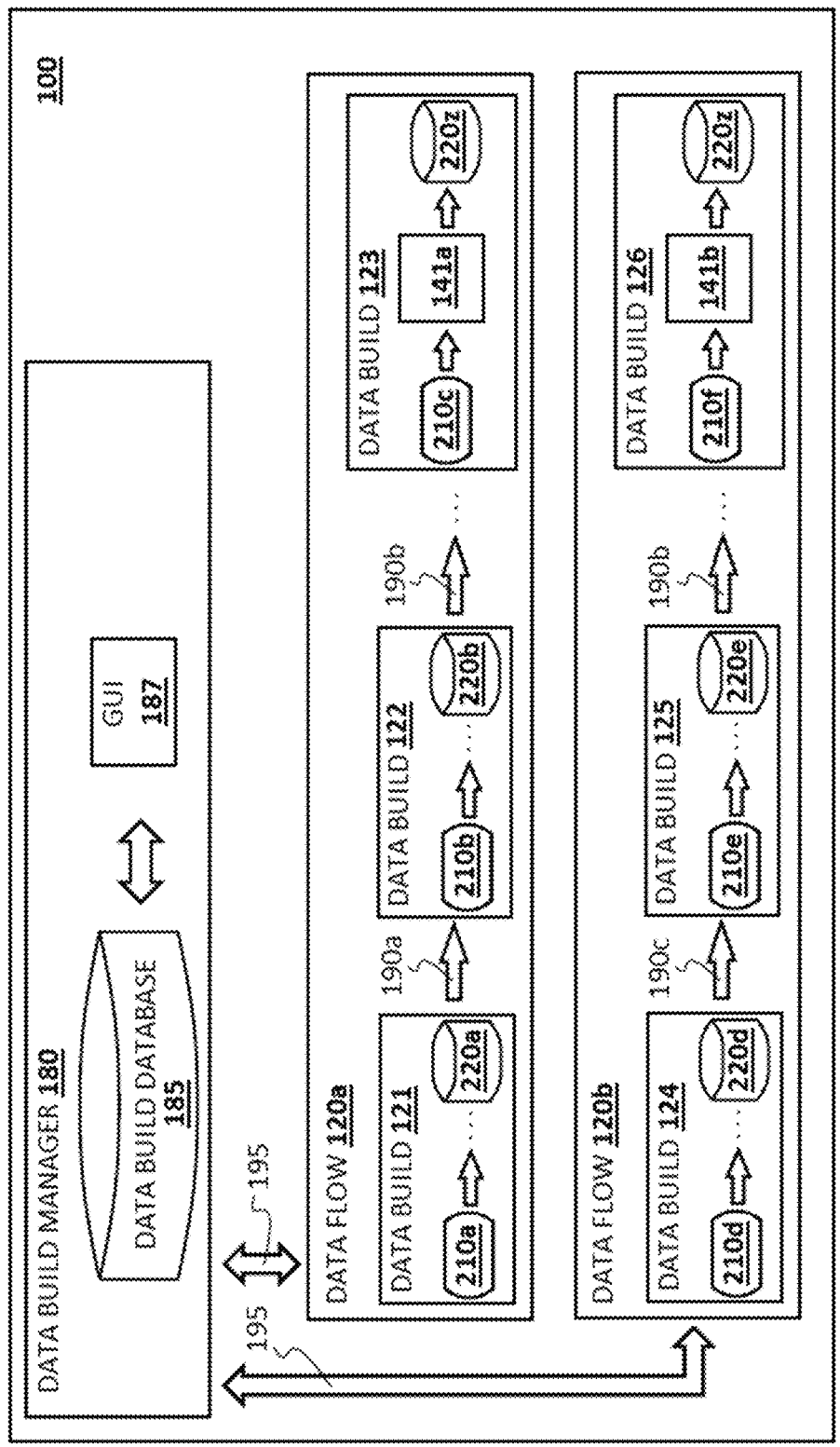
FIG. 6 illustrates an example of how a plurality of data flows from different data sources can be tracked according to various embodiments described herein.

FIG. 6 illustrates an example of how a plurality of data flows 120a, 120b, from different data sources can be tracked according to various embodiments described herein. In some embodiments, one or more data flows, such as a first data flow 120a and a second data flow 120b, may be created that have different source data sets but ultimately load data into the same final target dataset 220z. Each data build may comprise a conversion program 141. In some embodiments, a first conversion program 141a and a second conversion program 141b from different data builds 123, 126, may be configured to deposit data to the same final target dataset 220z. For example, a first source dataset 220a may be converted to a first target dataset 220a in a first data build 121. The first target data set 220a may be used as a second source dataset 210b and converted to a second target dataset 220b in a second data build 122. The second target data set 220b may be used as a third source dataset 210c and converted to a final target dataset 220z in a third data build 123. Likewise, a fourth source dataset 220d may be converted to a fourth target dataset 220d in a fourth data build 124. The fourth target data set 220d may be used as a fifth source dataset 210e and converted to a fifth target dataset 220e in a fifth data build 125. The fifth target data set 220e may be used as a sixth source dataset 210f and converted to a final target dataset 220z in a sixth data build 126, with both source datasets 210c and 210f converted and then deposited into the same final target dataset 220z.

Conversion information from multiple data flows 120a, 120b, may be selected for viewing or reporting by filtering data that has a specific target dataset 220. An example would be finding all source datasets 210a, 210b, 210c, 210d, 210e, 210f, for a given target dataset 220z. Filtering data for a specific target dataset 220 may be accomplished through the data build manager 180 such as through user input provided through a GUI 187.

As illustrated in FIG. 6, in some embodiments, one or more data flows 120a, 120b, may be created that share the same data processing step 190b. Furthermore, the system 100 may be capable of storing references to global semantic identifiers in the conversion metadata. A global semantic identifier is an identifier associated with a specific semantic meaning. They are generally used to harmonize data from two different data standards. For example, in data standard A, there could be an element named "ethnicity detail" and in data standard B, there could be an element named "ethnic code". The conversion metadata may include references to a common global semantic identifier to associate these elements from different data standards. Conversion information from multiple data flows 120a, 120b, may be selected for viewing or reporting by filtering data that has one or more specific data conversion processing steps 190a, 190b, 190c. A data conversion processing step 190 may be of interest due to a semantic identifier contained in the conversion metadata. Filtering data for a specific conversion processing step 190 or reference to a global semantic identifier may be accomplished through the data build manager 180 such as through user input provided through a GUI 187.

Referring to FIG. 6, in some embodiments, one or more data flows 120a, 120b, may be created that may have different source data sets 210a, 210d, but may ultimately load data into the same final target dataset 220z. Conversion information 195 from one or more data flows 120a, 120b, may be selected for viewing or reporting by filtering data that has a specific row or element in final target dataset 220z. Origin of a specific data row or element of a source 210 and/or target 220 dataset may come into question during analysis or publication. In such cases, filtering conversion data 195 for a specific row or element in a source 210 and/or target 220 dataset may be accomplished through the data build manager 180 such as through user input provided through a GUI 187.

Figure 7:
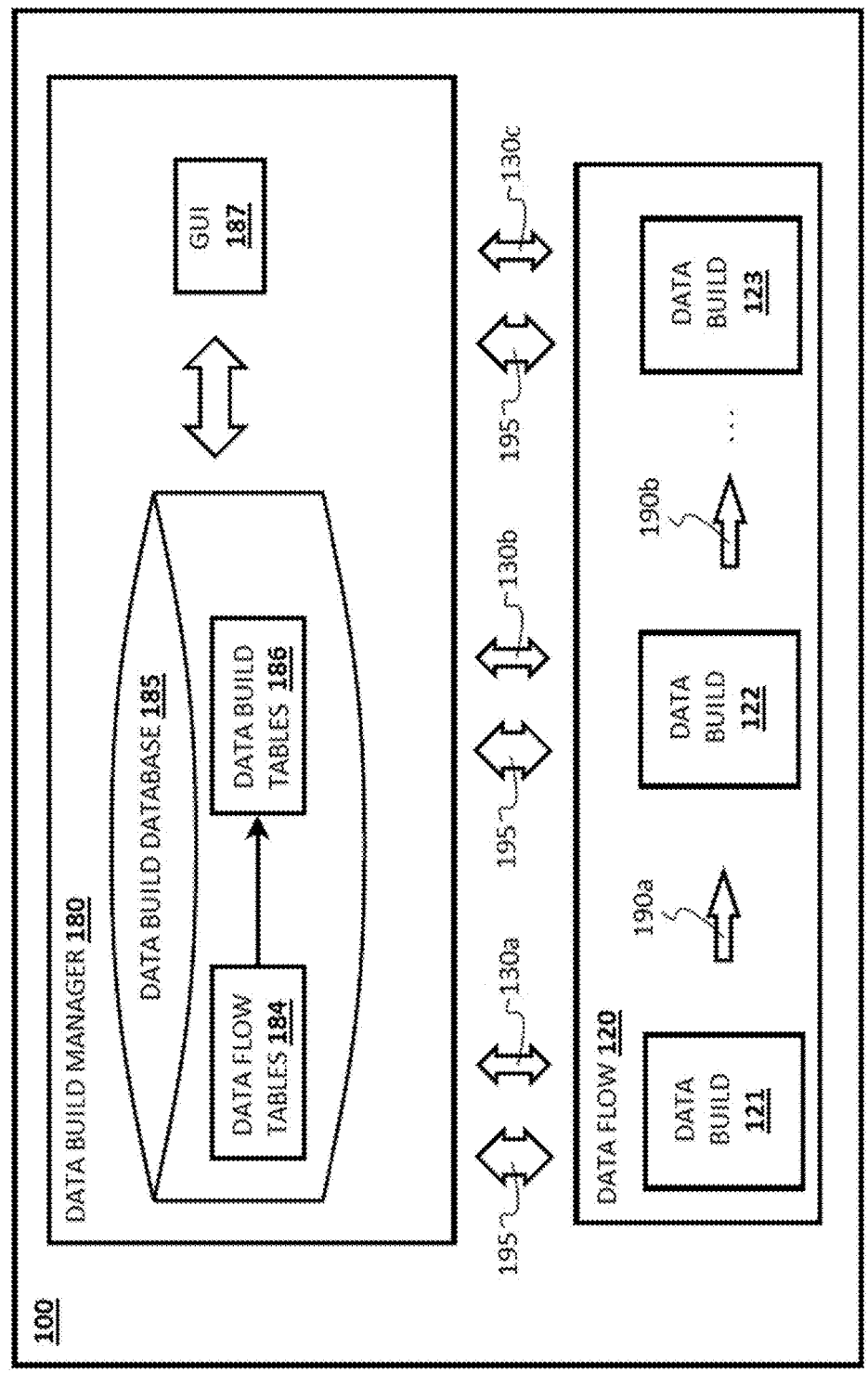
FIG. 7 shows an example of how data build and data flows can be executed via a data build manager engine according to various embodiments described herein.

FIG. 7 shows an example of how data builds 121, 122, 123, and data flows 120 can be executed via a data build manager engine 180 according to various embodiments described herein. In some embodiments, the data build manager 180 may, based on commands issued by a user through the data build manager GUI 187, and information relating parent data flows, such as may be found in data flow tables 184, to child data builds, such as may be found in data build tables 186, the data build execution controller 170, execute one or more data builds 121, 122, 123, and/or entire data flows 120. Data which describes the relationship between parent data flows and child data flows, data which describes the relationship between parent or source data builds and child or target data builds, and data which describes the relationship between parent or source datasets and child or target datasets may be referred to as lineage data. In some embodiments, data build execution attribute data 130 may comprise lineage data. Since conversion metadata for all data builds may contain source and destination table information, lineage data may be easily derived from the stored conversion metadata. For instance, the target data for data build 121 is the source data for data build 122. In further embodiments, a GUI 187 can be used to display data flow execution attribute data 130 and data flow conversion metadata. For instance, the GUI may display all data build steps for a data flow and the execution status of each data build step. As data builds 121, 122, 123, are executed, data build execution attribute data 130 may be created and sent back to the data build manager 180, by one or more conversion programs 141 (FIGS. 4-6) and stored in the data build manager database 185. For example and also referring to FIG. 5, a first conversion program 141a of a first data build 121 may send first data build execution attribute data 130a describing the data conversion performed by the first conversion program 141a to the data build manager database 185. Similarly, a second conversion program 141b of a second data build 122 may send second data build execution attribute data 130b describing the data conversion performed by the second conversion program 141b to the data build manager database 185. In some embodiments, the GUI 187 can be used to see if a data build in dataflow 120 failed execution. The GUI 187 could then be used to display any portion of the conversion metadata of the specific data build that failed execution.

Figure 8:
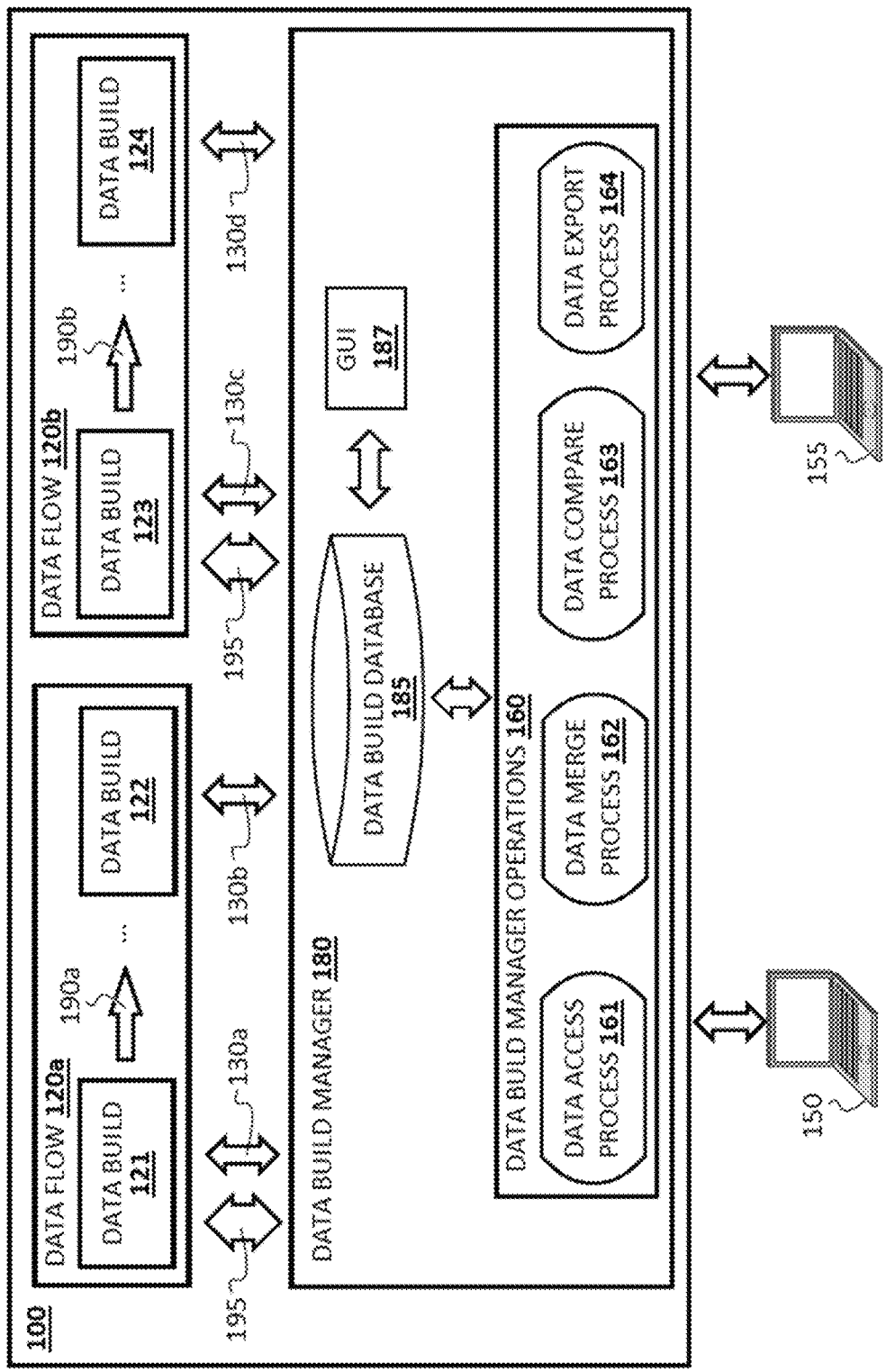
FIG. 8 shows an example of how operations upon datasets can be executed via the data build manager according to various embodiments described herein.

FIG. 8 shows an example of how operations upon datasets 220 can be executed via the data build manager 180 according to various embodiments described herein. In some embodiments, operations on all target datasets 220 (FIGS. 4-6) may be performed by the data build manager 180. Operations may be based on data build information stored in the data build database 185. In FIG. 8, the data build database 185 may comprise information for the data builds 121, 122, 123, 124. Furthermore, the data build manager 180 may store information regarding the data flows 120a, 120b, that the data builds 121, 122, and 123, 124, respectively, may be grouped into. Thus, the data build manager 180 can perform operations, through the conversion programs 141 (FIGS. 4-6) on the source 210 (FIGS. 4-6) and/or target 220 data sets according to data conversion information stored in its data build database 185. The data conversion information may be entered as conversion metadata which may be associated with a source data set 210, a target data set 220, a data flow 120, and/or a data build 121, 122, 123, 124. The data build manager engine 180 may use the conversion metadata to create a conversion program 141 in which the conversion program 141 instructions are retrieved or supplied by the respective conversion metadata. The data build manager engine 180 may be configured to perform a plurality of data build manager operations 160 or processes.

Examples of operations or processes the data build manager 180 may perform include but are not limited to the following:

1. A data access process 161 may be performed allowing direct data access to any data build's 121, 122, 123, 124, source 210 or target 220 dataset and conversion metadata. For example, using the data build manager 180, a user can determine what datasets 210, 220, have been processed by a specific conversion program 141 through the conversion metadata. The user can then use a third party data analysis application 150 or tools to access those data sets 210, 220, and perform analysis.

2. A data merger process 162 may be performed allowing data from any data set 210, 220, can be merged. For example, using the data build manager 180, a user can determine what data sets 210, 220, have been processed to conform to a specific data standard through the conversion metadata. The user can then direct the data build manager 180 to merge the identified datasets 210, 220, to create one or more new datasets, secure in the knowledge that all the merged new data sets conform to a specific regulatory standard.

3. A data compare process 163 may be performed allowing data from any dataset 210, 220, can be compared. For example, using the data build manager 180, a user can determine what datasets 210, 220, have been processed with conversion metadata that share similar attributes. The user can then compare the identified datasets 210, 220, to determine if and how differences in conversion metadata relate to differences in data.

4. A data export process 164 may be performed allowing datasets 210, 220, and data artifacts from any data build 121, 122, 123, 124, can be exported. For example, using the data build manager 180, a user may determine what datasets 210, 220, have been processed by using conversion metadata that converts data to the same data standard. The user can then export those datasets 210, 220, and artifacts for submittal to a regulatory agency, such as through a reporting and submission application 155 or any other source capable of receiving data.

Figure 9:
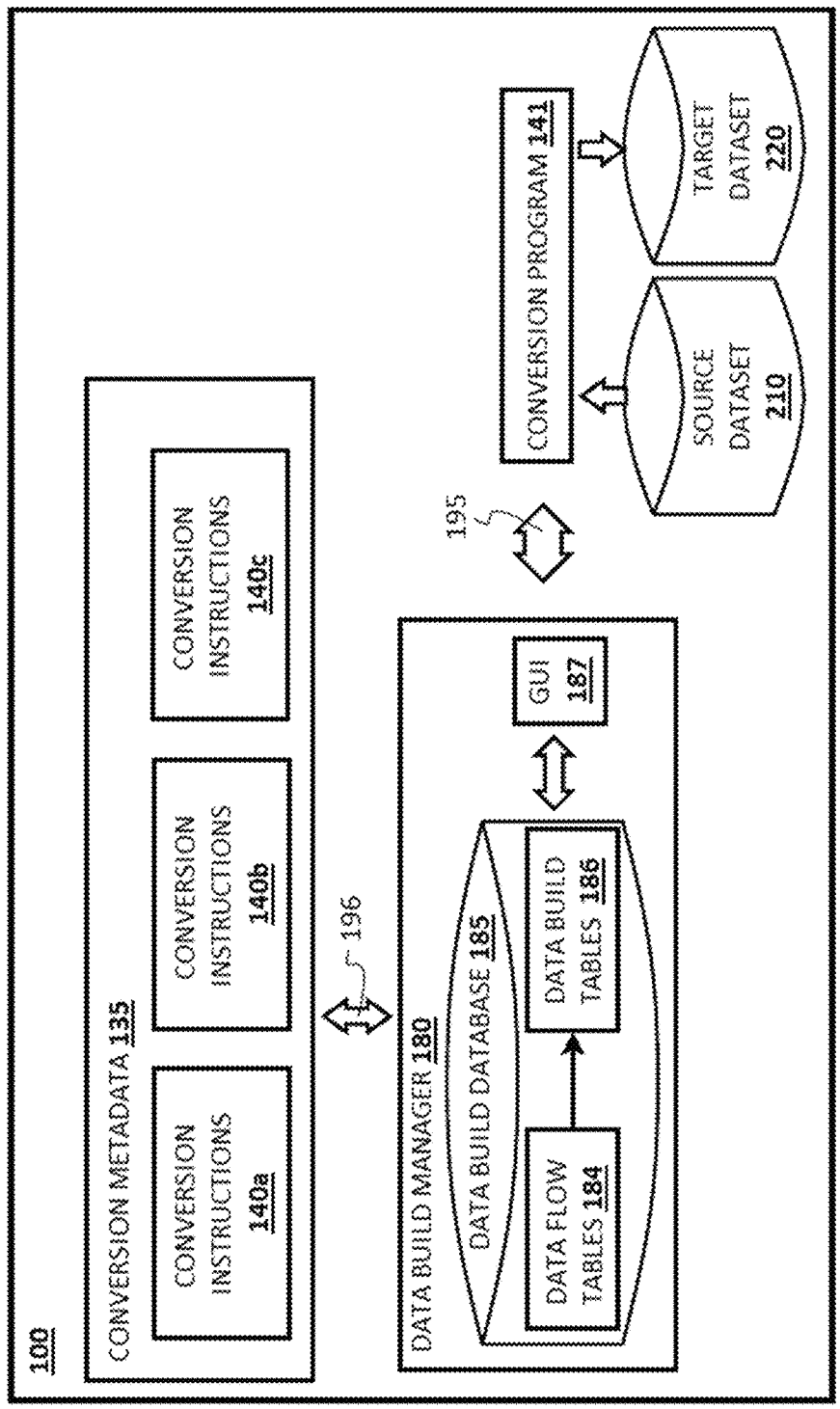
FIG. 9 shows illustrates how conversion metadata is used to generate conversion programs and how conversion metadata is associated with resultant data at the element level according to various embodiments described herein.

FIG. 9 shows illustrates how conversion metadata 135 may be used to generate conversion programs 141 and how conversion metadata 135 may be associated with resultant data target 220 at the element level according to various embodiments described herein. In the some embodiments, automated versioning may keep conversion metadata versions in sync with datasets 210, 220, down to the data row and data element level of each dataset 210, 220. In further embodiments, one or more conversion instructions 140 may be entered into or as conversion metadata 135, such as through the GUI 187 of a data build manager 180. Conversion metadata information 196 may be sent and received by the data build manager 180 to be stored in a data build database 185. The data build manager 180 may then create a conversion program 141 which may convert a source dataset 210 into a target dataset 220 based on the conversion instructions 140. The conversion program 141 may send and receive data flow conversion information 195, including execution attribute data, to the data build manager 180.

The data build manager 180 may also create a unique version number which may be associated and stored with the conversion metadata 135, with the conversion program 141, and with the target dataset 220 with the processor in the memory, such as in the data build database 185. In further embodiments, the data build manager 180 may associate and store the unique version number with one or more data rows, fields, and data elements of each target dataset 220. In still further embodiments, the data build manager 180 may associate and store the unique version number with one or more, including every, converted data element in a target dataset 220. A unique version number may comprise any set of characters or data, such as a string of characters, so that each version number is unique from any other version number of the system 100, thereby allowing the unique version number to be used to identify the processing metadata and resultant target data. Each unique version number may be a unique identifier that comprises of one or more sequences of numbers or letters generally assigned in increasing order. In some embodiments, a unique version number may be created to correspond to new development or changes in the conversion metadata.

As an example, the conversion metadata 135 may include a first conversion instruction 140a, such as to extract an element A from a source data set 210. The conversion metadata 135 may further include a second conversion instruction 140b, such as to convert said element A to an element B. The conversion metadata 135 may further include a third conversion instruction 140c, such as to load said element B into a target dataset 220 element C. In some embodiments, a unique version number or other identification (ID) may be associated with the conversion metadata 135. In further embodiments, a unique version number may be associated with each converted data row and/or each data element of a target data set 220. The data build manager 180 may use the conversion instructions 140a, 140b, 140c, in the conversion metadata 135 to create a conversion program 141. The conversion program 141 may then extract said element A from a source dataset 210, convert said element A to said element B, and load said element B into said element C. The unique version number of the conversion metadata 135 may be associated or embedded in the instructions of the conversion program 141. When a conversion program 141 is run, the unique version number may be attached to the data that is written to target data set 310. In alternative embodiments, the data build manager 180 may create and associate one or more different unique version numbers to the conversion metadata 135, the conversion program 141, the target dataset 220 one or more data rows, fields, and data elements of each target dataset 220, and/or one or more, including every, converted data element in a target dataset 220.

Figure 10:
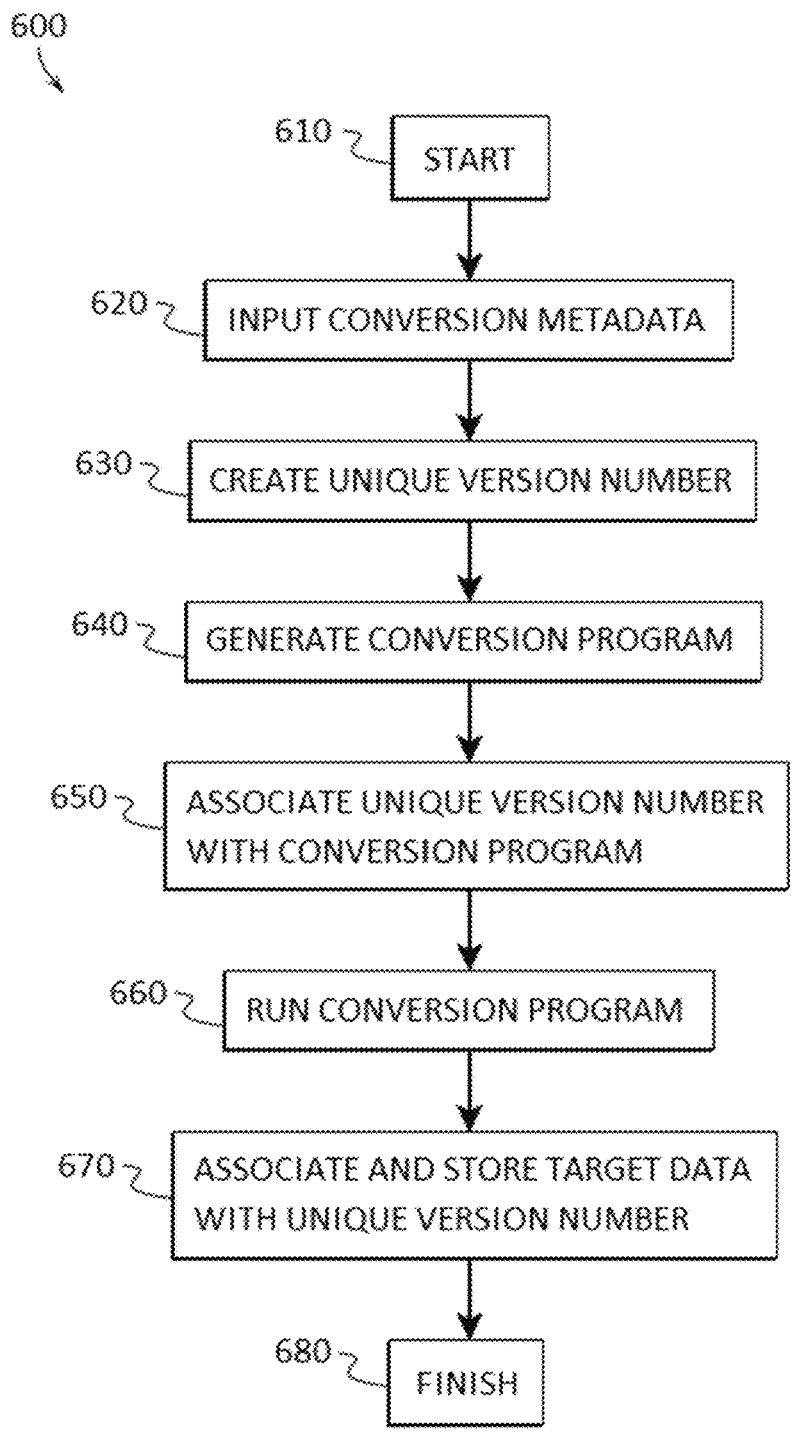
FIG. 10 shows a block diagram illustrating a process for linking new conversion metadata to datasets by automating data conversion according to various embodiments described herein

FIG. 10 shows a block diagram illustrating a process for linking new conversion metadata to datasets with automated versioning ("the method 600") by automating data conversion according to various embodiments described herein. In some embodiments, the method 600 may begin 610 and a user may input data conversion metadata 620 into a database, such as in a data build database 185. The user may input conversion metadata into a data build manager engine 180 through GUI 187 of a computer comprising a processor and memory. The processor may be configured to execute instructions, such as rules engines, of a data build manager engine 180 and a conversion program 141 with data stored in the memory. A unique version number may be created in step 630 by the data build manager engine 180. In further embodiments, the unique version number may be associated and stored with the conversion metadata by the data build manager engine 180. In some embodiments, the conversion metadata may be read from a database, such as a data build database 185, and used to generate a conversion program 141 in step 640 comprising conversion program instructions 140 derived from the conversion metadata. In other embodiments, the conversion metadata may be read from a database, such as a data build database 185, and sent to a conversion program 141 as program instructions 140 derived from the conversion metadata.

In some embodiments, the data build manager engine 180 may associate the unique version number with the conversion program 141 in step 650. Next, the conversion program 141 may be run in 660 to convert one or more source datasets 210 into one or more target datasets 220. In some embodiments, the data build manager engine 180 and/or the conversion program 141 may associate and store the unique version number with conversion program instructions 140 in memory, such as in a data build database 185. In further embodiments, the data build manager engine 180 and/or the conversion program 141 may associate and store the unique version number with the target data 220 in memory, such as in a data build database 185 in step 670. In still further embodiments, the data build manager engine 180 and/or the conversion program 141 may associate and store the unique version number with one or more data elements, data rows, or fields of the target data 220 in memory, such as in a data build database 185. After the unique version number is associated and stored with the target data 220 in memory, the method 600 may finish 680.

In some embodiments, the user may issue commands to run the conversion program 141 and any other processes or operations of the data build manager engine 180 through the GUI 187. In further embodiments, running the conversion program 141 may automatically attach the unique version number to the resultant or converted target data 220. Thus the conversion metadata is always completely in sync with each target dataset 220 and internal integrity of a data build 121, 122, 123, 124 is ensured.

Figure 11:
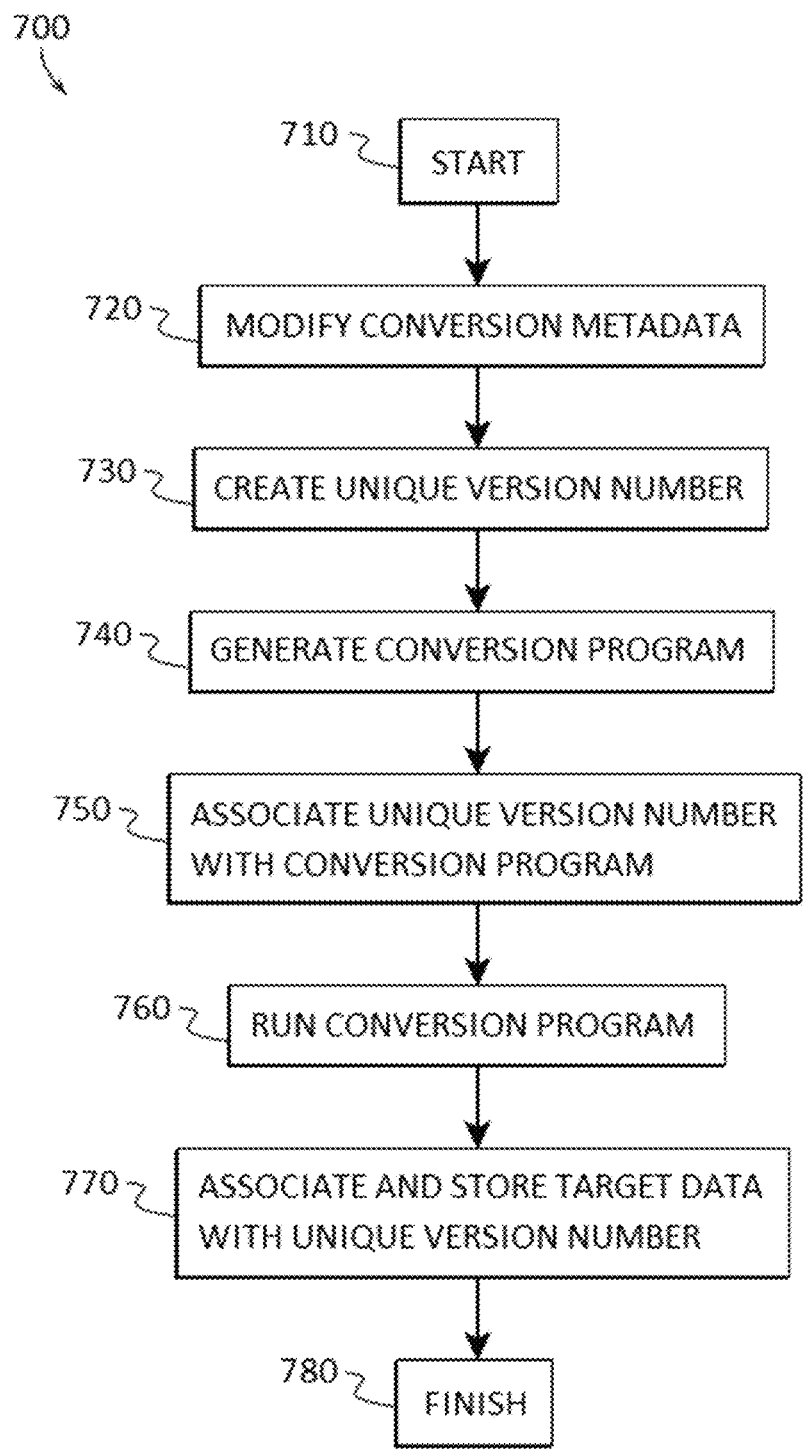
FIG. 11 shows a block diagram illustrating a process for linking modified metadata to datasets by automating data conversion according to various embodiments described herein.

FIG. 11 shows a block diagram illustrating a process for linking modified metadata to datasets by automating data conversion ("the method 700") to perform automated versioning to keep subsequent conversion metadata revisions in sync with resultant target datasets. In some embodiments, the method 700 may begin 710 and a user may modify data conversion metadata 720 into a database, such as in a data build database 185. The user may modify conversion metadata into a data build manager engine 180 through GUI 187 of a computer comprising a processor and memory. The processor may be configured to execute instructions, such as rules engines, of a data build manager engine 180 and a conversion program 141 with data stored in the memory. When the conversion metadata is modified, a unique version number may then be created in step 730 by the data build manager engine 180. In further embodiments, the unique version number may be associated and stored with the modified conversion metadata by the data build manager engine 180. In some embodiments, the modified conversion metadata may be read from a database, such as a data build database 185, and used to generate a conversion program 141 in step 740 comprising conversion program instructions 140 derived from the modified conversion metadata. In other embodiments, the modified conversion metadata may be read from a database, such as a data build database 185, and sent to a conversion program 141 as program instructions 140 derived from the modified conversion metadata.

In some embodiments, the data build manager engine 180 may associate the unique version number with the conversion program 141 in step 750. In further embodiments, the unique version number created when the conversion metadata is modified may be associated and stored with the conversion metadata, with the conversion program, and with each converted data element with the processor in the memory. Next, the conversion program 141 may be run in 760 to convert one or more source datasets 210 into one or more target datasets 220. In some embodiments, the data build manager engine 180 and/or the conversion program 141 may associate and store the unique version number with conversion program instructions 140 in memory, such as in a data build database 185. In further embodiments, the data build manager engine 180 and/or the conversion program 141 may associate and store the unique version number with the target data or dataset 220 in memory, such as in a data build database 185 in step 770. In still further embodiments, the data build manager engine 180 and/or the conversion program 141 may associate and store the unique version number with one or more data elements, data rows, or fields of the target data 220 in memory, such as in a data build database 185. In still further embodiments, the source dataset, conversion metadata with the associated unique version number, and the target dataset may be stored with the associated unique version number as a data build. After the unique version number is associated and stored with the target data 220 in memory, the method 700 may finish 780.

In some embodiments, the target dataset of a first data build may be used as a second source dataset to create a second data build comprising the second source dataset, a second conversion metadata with a second associated unique version number, and a second converted dataset with the second associated unique version number. In some embodiments, the user may issue commands to run the conversion program 141 and any other processes or operations of the data build manager engine 180 through the GUI 187. In further embodiments, running the conversion program 141 may automatically attach the unique version number to the resultant or converted target data 220. Thus the modified conversion metadata is always completely in sync with each target dataset 220 and internal integrity of a data build 121, 122, 123, 124 is ensured.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device such as a personal digital assistant (PDA), laptop computer, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method of data tracking a source dataset comprising a plurality of data elements in a computer system comprising a memory, a processor, and a plurality of software instructions, the software instructions when executed by the process cause the process to execute the method comprising the steps of:

receiving, from a client device, data conversion instructions for one or more data elements of the plurality of data elements, at a data build manager;

storing, by the data build manager, the data conversion instructions as conversion metadata;

associating, by the data build manager, the conversion metadata with the source dataset in the memory;

creating, by the data build manager, a unique version number based on the conversion metadata;

creating, by the data build manager, a conversion program from the conversion instructions of the conversion metadata;

executing, by the processor, the conversion program to perform a data conversion on the one or more data elements to form a target dataset comprising one or more converted data elements; and associating and storing, by the data build manager, the unique version number with the conversion metadata, with the conversion program, and with the target dataset in the memory.

2. The method of claim 1, wherein another unique version number is created, by the data build manager, when the conversion metadata is modified.

3. The method of claim 2, wherein the another unique version number is associated and stored with the conversion metadata, with the conversion program, and with the target dataset with the processor in the memory.

4. The method of claim 3, wherein the execution attributes are stored in the data build.

5. The method of claim 4, wherein the data flow comprises lineage data describing the relationship between the first data build and the second data build.

6. The method of claim 5, wherein a graphic user interface is configured to present summary information of the data builds in a data flow, and wherein the graphic user interface may be used to select an item of summary information regarding a data build, and the conversion metadata associated with the summary information of that data build may then be presented to the user by the graphic user interface.

7. The method of claim 1, further comprising the step of storing, by the data build manager, the source dataset, conversion metadata with the associated unique version number, and the target dataset with the associated unique version number as a data build, in the memory.

8. The method of claim 7, wherein the target dataset of a first data build is used as a second source dataset to create a second data build comprising the second source dataset, a second conversion metadata with a second associated unique version number, and a second target dataset with the second associated unique version number.

9. The method of claim 1, wherein the conversion program creates execution attributes.

10. The method of claim 9, wherein the first data build and second data build are stored as a data flow in the memory.

11. A method of data tracking a source dataset comprising a plurality of data elements in a computer system comprising a memory, a processor, and a plurality of software instructions, the software instructions when executed by the process cause the process to execute the method comprising the steps of:
receiving, from a client device, data conversion instructions for one or more data elements of the plurality of data elements, at a data build manager;
storing, by the data build manager, the data conversion instructions as conversion metadata;
associating, by the data build manager, the conversion metadata with the source dataset in the memory;
creating, by the data build manager, a unique version number based on the conversion metadata;
creating, by the data build manager, a conversion program from the conversion instructions of the conversion metadata;
executing, by the processor, the conversion program to perform a data conversion on the one or more data elements to form a target dataset comprising one or more converted data elements; and
associating and storing, by the data build manager, the unique version number with the conversion metadata, with the conversion program, and with each converted data element in the memory.

12. The method of claim 11, wherein another unique version number is created when the conversion metadata is modified, by the data build manager, and, wherein the another unique version number created when the conversion metadata is modified is associated and stored with the conversion metadata, with the conversion program, and with each converted data element with the processor in the memory.

13. The method of claim 12, further comprising the step of associating, by the data build manager, and storing the another unique version number with the target dataset.

14. The method of claim 13, further comprising the step of storing the source dataset, conversion metadata with the associated unique version number, and the target dataset with the associated another unique version number as a data build.

15. The method of claim 13, wherein the conversion program creates execution attributes.

16. The method of claim 15, wherein the execution attributes are stored in the data build.

17. The method of claim 16, wherein the target dataset of a first data build is used as a second source dataset to create a second data build comprising the second source dataset, a second conversion metadata with a second associated unique version number, and a second converted dataset with the second associated unique version number.

18. The method of claim 17, wherein the first data build and second data build are stored as a data flow in the memory.

19. The method of claim 18, wherein the data flow comprises lineage data describing the relationship between the first data build and the second data build.

20. The method of claim 19, wherein a graphic user interface is configured to present summary information of the data builds in a data flow, and wherein the graphic user interface may be used to select an item of summary information regarding a data build, and the conversion metadata associated with the summary information of that data build may then be presented to the user by the graphic user interface.

* * * * *